March 23, 1954     A. H. CROUCHER     2,673,039
PIRN WINDING MACHINE

Filed Aug. 25, 1950     10 Sheets-Sheet 1

ANTONY H. CROUCHER
By Hall & Houghton
Attorneys

March 23, 1954

A. H. CROUCHER 2,673,039

PIRN WINDING MACHINE

Filed Aug. 25, 1950

ANTONY H. CROUCHER
By Hall & Houghton
Attorneys

March 23, 1954  A. H. CROUCHER  2,673,039
PIRN WINDING MACHINE
Filed Aug. 25, 1950  10 Sheets-Sheet 3

ANTONY H. CROUCHER
By Hall & Houghton
Attorneys

March 23, 1954 A. H. CROUCHER 2,673,039
PIRN WINDING MACHINE
Filed Aug. 25, 1950 10 Sheets-Sheet 4

ANTONY H. CROUCHER
By Hall & Houghton
Attorneys

March 23, 1954
A. H. CROUCHER
2,673,039
PIRN WINDING MACHINE
Filed Aug. 25, 1950
10 Sheets-Sheet 5
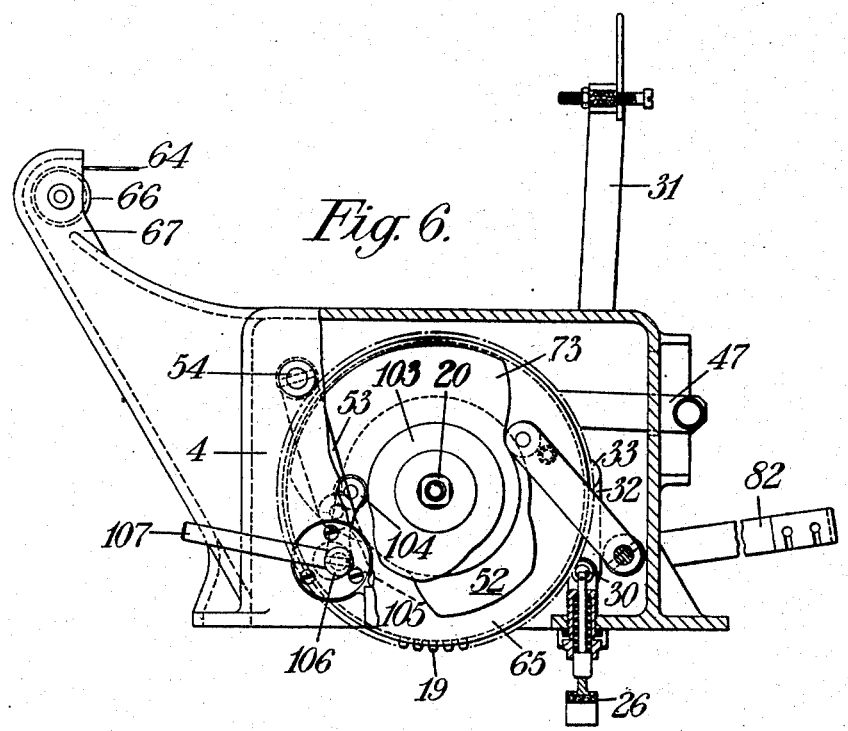
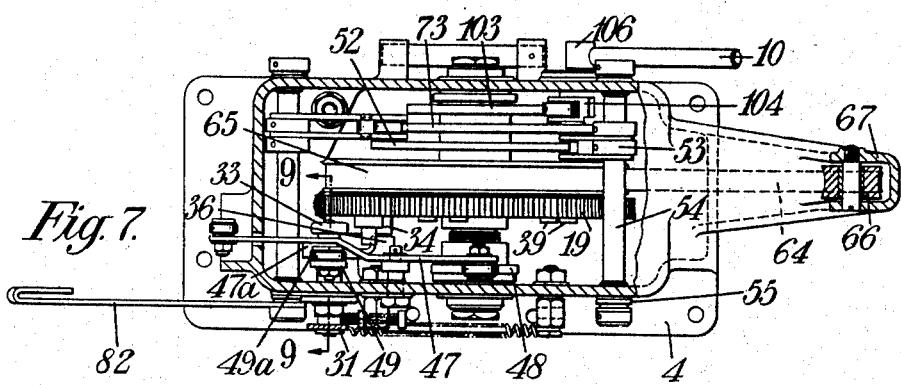
ANTONY H. CROUCHER
By Hall & Houghton
Attorneys March 23, 1954 — A. H. CROUCHER — 2,673,039
PIRN WINDING MACHINE
Filed Aug. 25, 1950 — 10 Sheets-Sheet 7
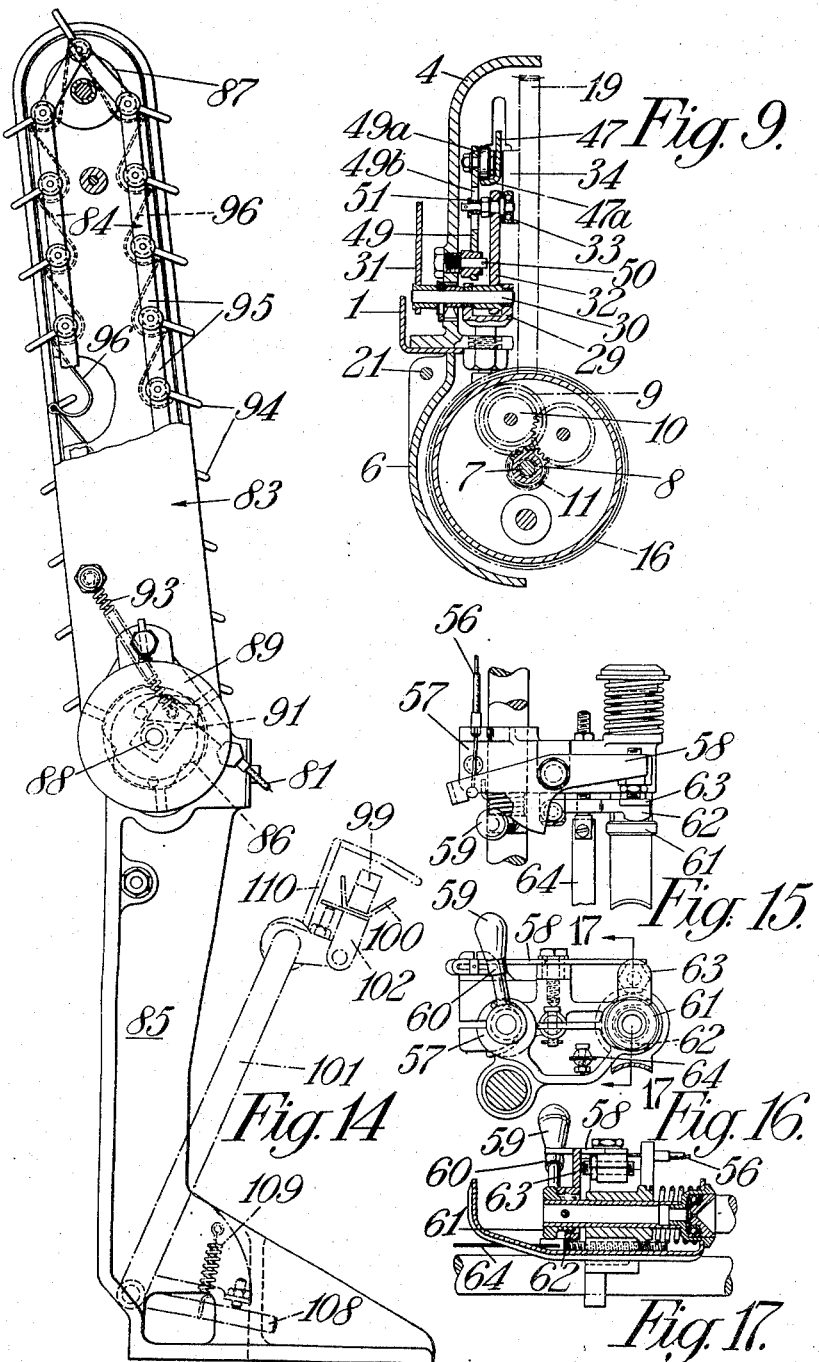
ANTONY H. CROUCHER
By Hall & Houghton
Attorneys

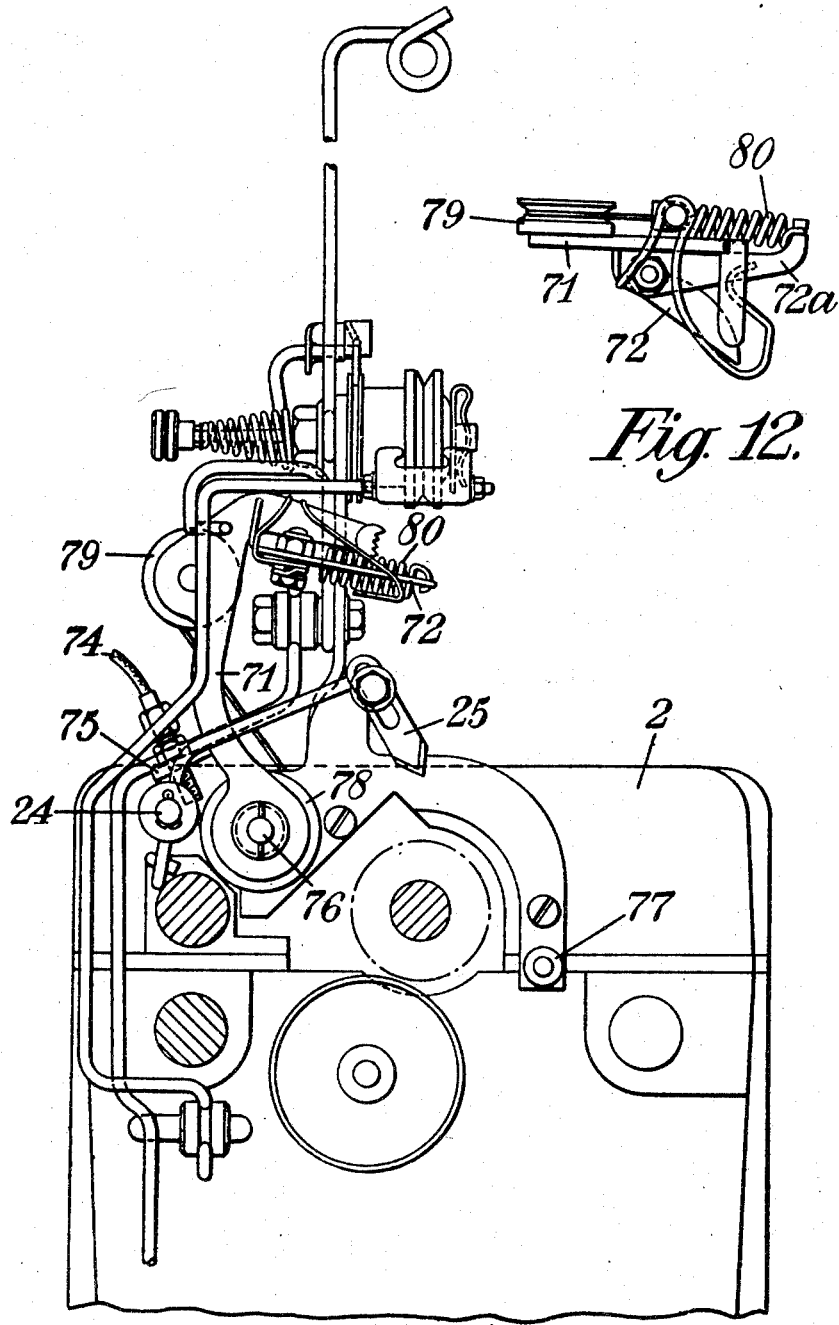

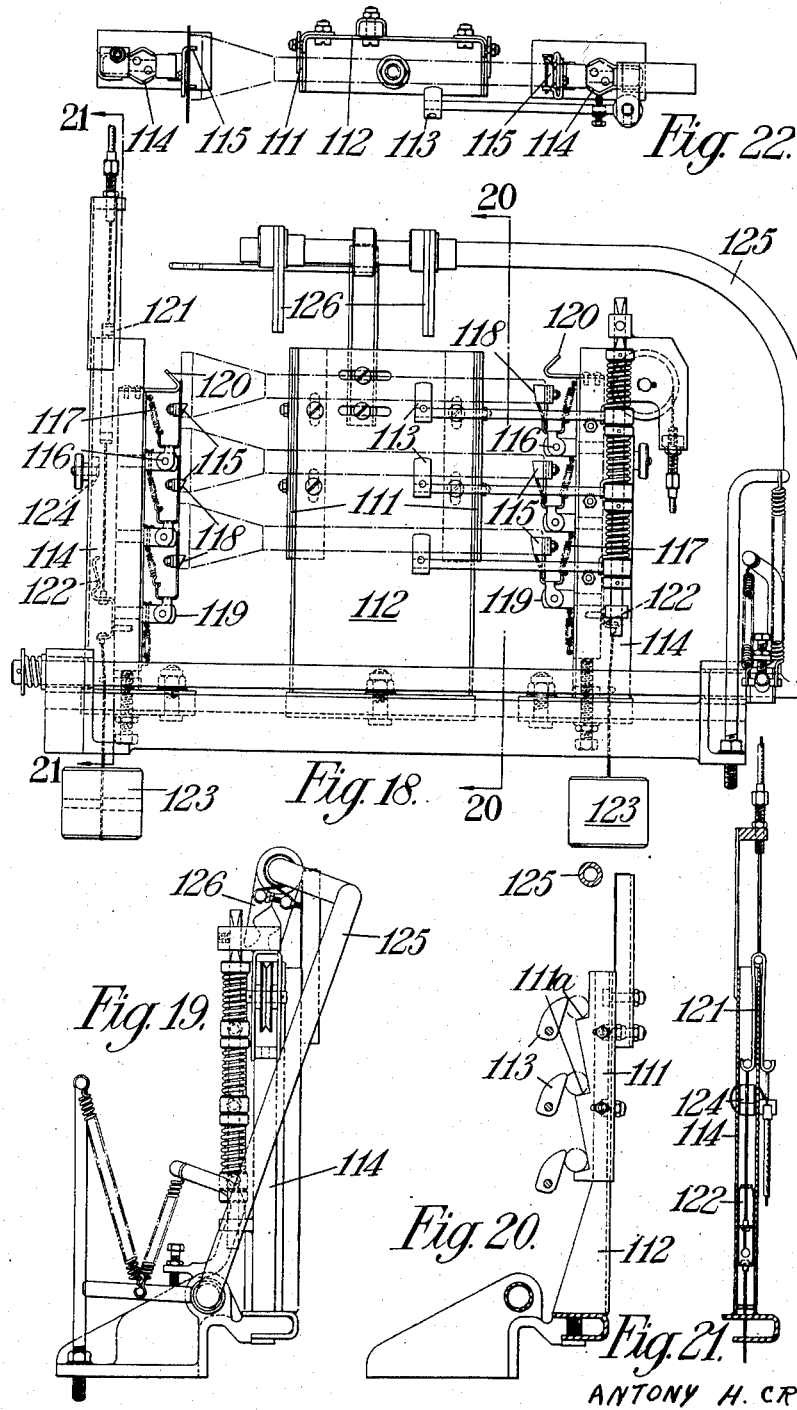

Patented Mar. 23, 1954

2,673,039

UNITED STATES PATENT OFFICE 2,673,039

PIRN WINDING MACHINE

Antony Harry Croucher, Esher, England, assignor to Wildt and Company Limited, Bookham, England Application August 25, 1950, Serial No. 181,452

Claims priority, application Great Britain August 30, 1949

25 Claims. (Cl. 242—35.5)

This invention relates to pirn winding machines and more especially but not solely to pirn winding machines of the character described in British Specification No. 617,895.

Such machines comprise a winding spindle driving the pirn to be formed by means of a driving centre, e. g. in the form of a pad, an outer centre or tailstock for the pirn being wound, a carriage for withdrawing the driving centre and outer centre to the starting position, and a feed nut or a feed screw for advancing the carriage during the winding operation.

The functions which an operative hitherto had been required to perform, consequent upon the winding machine having completely wound a pirn with yarn and the machine then having stopped itself automatically, are as follows:

(1) Release the feed nut by gripping the catch provided and withdraw the carriage to the starting position again re-engaging the feed nut by releasing the catch.

(2) Hold the full pirn and release the tailstock or outer centre, by the knob provided, thus enabling the pirn to be withdrawn from the inner driving centre which is in the form of a pad;

(3) Break off, or cut, the yarn at the end of the winding, thus completely freeing the full pirn;

(4) Take up another empty pirn, and trapping the free end of the yarn (just broken off and coming from the supply package), between the head of the pirn and the driving centre pad, insert the pirn between the centres by reversing the releasing procedure;

(5) Re-position the supply yarn in the thread guide or over a knock-off actuation guide, as necessary;

(6) Re-set or cock the bunch building mechanism if in use, by pushing the thread guide fully back towards the machine.

The object of the invention is to provide a machine including mechanism to effect in addition to the winding operation all or as many as may be desired of the operations above enumerated.

Machines as claimed in British specification No. 617,895 comprise one or more winding units including individual electric motor drives, and it is therefore important that the means employed to effect all these operations be similarly arranged.

The invention consists of an automatic pirn winding machine of the kind comprising a winding spindle driving the pirn to be formed by means of a driving centre, e. g. in the form of a pad, an outer centre or tailstock for the pirn being wound, a carriage for withdrawing the driving centre and outer centre to the starting position, and a feed nut or a feed screw for advancing the carriage during the winding operation, in which an electric motor is coupled to drive both the winding mechanism and the pirn changing mechanism.

The invention further consists of an automatic pirn winding machine of the kind comprising a winding spindle driving the pirn to be formed by means of a driving centre, e. g. in the form of a pad, an outer centre or tailstock for the pirn being wound, a carriage for withdrawing the driving centre and outer centre to the starting position and a feed nut or a feed screw for advancing the carriage during the winding operation, in which a single driving member is adapted to be coupled by differential gearing to drive in turn the winding mechanism and the pirn changing mechanism.

Preferably, the winding mechanism is adapted to be driven in one direction or the other at will and the pirn changing mechanism is adapted to be driven in the same direction irrespective of the direction of drive of the winding mechanism.

Conveniently the drive is effected through an epicyclic differential gearing in association with right- and left-hand worm gearing.

The direction of drive to the winding mechanism may be changed by reversing the electrical connections to the motor.

Conveniently, the electric motor and associated gearing are moved in a carriage adapted to be slid as a unit to reverse the connections and interchange the two worms gearing in the drive to the pirn changing mechanism.

The pirn changing unit may be held by a positive stop or trip engaging with a face or ledge projecting from one side member of the worm wheel driven by the worm gearing. Then when the pirn changing unit is functioning a brake holds the winding unit.

Conveniently when the winding unit has reached the end of a winding operation, it operates a lever which trips the positive stop of the ledge to free the rotation of the worm wheel and also applies the brake to the winding mechanism.

For this purpose the worm wheel may be an annulus or rim sandwiched between two discs under pressure under the action of a plurality of springs positioned about the discs and passing horizontally through them, the shaft on which they are mounted being square sectioned and having mounted upon it a plurality of cams, one of which is adapted to effect the doffer and nut release, a second adapted to operate the collector, and a third the loader subsequently to be described.

Connection of the rim with the shaft in the manner above referred to in effect provides a slipping clutch which limits the torque transmitted to the shaft which may be considerable due to the gear reduction involved and other causes.

Conveniently, the pirn changing mechanism is operated over the plurality of cams and is effected by a single revolution of the cam shaft.

Means is provided for simultaneously tripping the thread guide into a rearward position with the release of the drive of the winding unit and the application of a brake thereby to re-set the bunch building mechanism of the winding mechanism and brake the guide to a position immediately over the driving centre faced pad; these operations being effected prior to the release of the feed nut and the withdrawal of the carriage supporting the full pirn.

The release of the feed nut is conveniently effected through the intermediary of one of the cams about referred to, acting through an appropriate linkage and a Bowden wire mechanism or flexible cable, the cam having two lift stages, the first being sufficient to actuate the feed nut release, and the second to withdraw the tailstock quill or outer centre from engagement with the full pirn.

For this purpose there is provided a lever extending across the tailstock and connected with or impinging on a projection from a yoke or fork carried on a pivot fork at the front of the tailstock body and extending beyond the nut on the end of the tailstock which would normally be actuated by hand for withdrawing the quill, adjustment between the lever and yoke being provided to ensure that the initial movement of the lever in actuating the feed nut release does not start to withdraw the quill; a truly radial portion of the cam of the lever being provided so that no further effect upon the feed nut will occur when the quill is withdrawn.

The withdrawal of the carriage of the pirn winding machine into its initial winding position after release of the feed nut is effected by a flexible tape or the like, one end of which is secured to the carriage and the other to a drum with which is associated means adapted at appropriate intervals or times to rotate the drum in a direction to wind the flexible tape or the like on to it and means adapted to release the drum to permit feed motion of the carriage in the operation of winding a pirn.

The connection of the tape or like flexible member is preferably effected by securing one end to the tailstock body of the pirn winding machine between which and a headstock on the carriage, the pirn is engaged.

Preferably, the tape or the like is adjustably engaged or anchored to the tailstock body and passes through a hollow bracket in the drum to which it is anchored and which is provided with means whereby its rotation is interrupted when the carriage has reached its extreme outward position in which it engages against a stop.

The drum may be located on the same shaft as the worm wheel and driven thereby.

To release the tape when the carriage is fully withdrawn, or in other words to ensure that the drum ceases to rotate, it is driven through a roller in the slide constrained by guides formed in an arm within the drum and spring constrained in a radially outward direction, while the rim of the drum is provided with a member which may be the head of the bolt securing the tape to the drum, chamfered on its opposite sides to provide small cam surfaces or ramps, so that the roller in question may freely roll round the inside of the circumferential surface of the cam drum rim until it comes into contact with it, and then either jumps or rolls over.

A collector over and adjacent to the head of the pirn is operated by one of the cams through the medium of a cable arrangement and takes the length of yarn leading down to the wound pirn and draws it in a loop to the right of the pirn where it holds it nipped.

A cutter is provided on the end of the collector to cut the yarn, enabling the full pirn to be freed.

The cutter preferably comprises two vanes hinged together scissor-wise.

Optionally, a further cutter or knife may be provided.

Means is provided in the form of a guide wire adapted to engage part of the loop and left between the feed point and the collector which still holds its end to draw it into another loop over and across the driving face of the inner driving centre pad.

For entering an empty pirn between the centres there is provided a magazine adapted to feed successive pirns at appropriate intervals into a clip or trough-like member which is adapted to be swung from a position adjacent to the magazine to a position below the centres, so that on the release of the tailstock quill and centre the empty pirn will be gripped between the centres and will also grip the yarn which has been drawn across the driving centre pad thereby gripping the yarn between the head of the pirn and the pad.

The motion imparted to the clip or trough is conveniently effected by mounting the trough upon an oscillating arm by which the clip or trough is engaged in association with torsion springs adapted to permit or effect the rocking of the trough to free the spool.

Conveniently, in accordance with the invention, the magazine is in effect a wide chain, to the hinged pins of which are secured two or more lengths of flexible endless tapes arranged to form loops extending from one chain to the next chain, so that the loops or troughs form a festoon adapted to carry a pirn.

The chain normally comprises two sets of links engaging wires extending between the two sets, the wires forming in effect the rollers of the chain and engaging upper and lower sprockets to which motion is imparted at suitable intervals or continuously at an appropriate speed, so that the chain is moved through one pitch in the interval between feeding one pirn to the centres and fully winding the pirn and releasing it, to supply the next succeeding pirn.

In an arrangement in which the magazine is mounted below the spindle level of the winding machine the pirns in the magazine are transferred upwards on a fixed rack, one ledge of the rack at a time, by means of grippers which pick up the pirn from underneath each end and lift it to the next rack position.

The invention will be further described with reference to the accompanying drawings as a whole.

Figure 6 is a reverse side elevation of the cam box with the casing cut away;

Figure 7 is a plan of the cam box with the casing cut away;

Figure 9 shows part of the cam box in section on the line 9—9 of Figure 7;

Figure 11 shows the collector and knife assembly in section on line 11—11 of Figure 1;

Figure 12 is a plan of the scissor mechanism;

Figure 14 is an end elevation;

Figure 15 is a plan of the tailstock assembly;

Figure 16 is an end elevation of same;

Figure 17 is a section on the line 17—17 of Figure 16;

Figure 18 is a side elevation of an alternative pirn magazine and elevator assembly;

Figure 19 is an end elevation of same;

Figure 20 is a section on the line 20—20 of Figure 18;

Figure 21 is a section on the line 21—21 of Figure 18;

Figure 22 is a plan of the same with the loader not shown.

Figure 1:
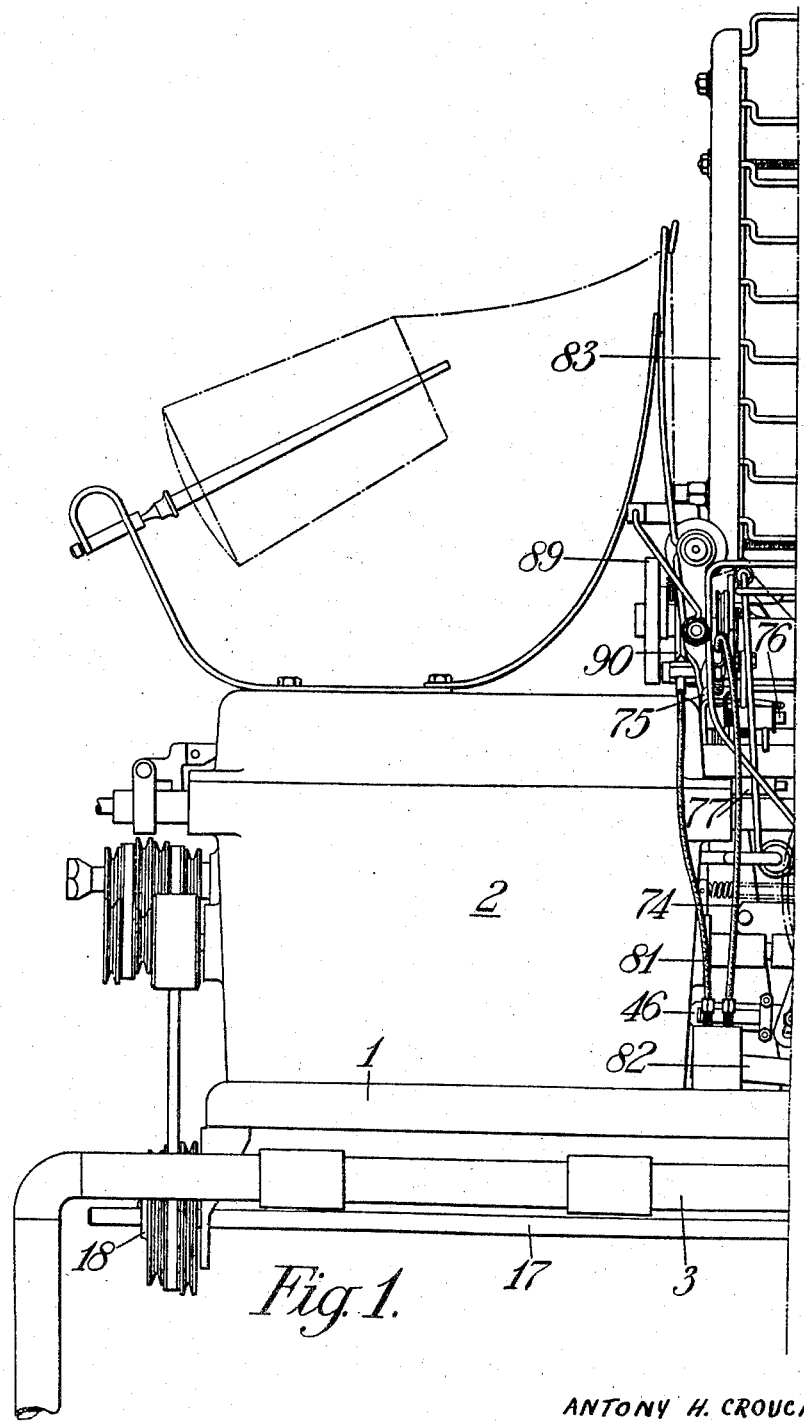
Figures 1 and 1a show a side elevation.
Figure 1A:
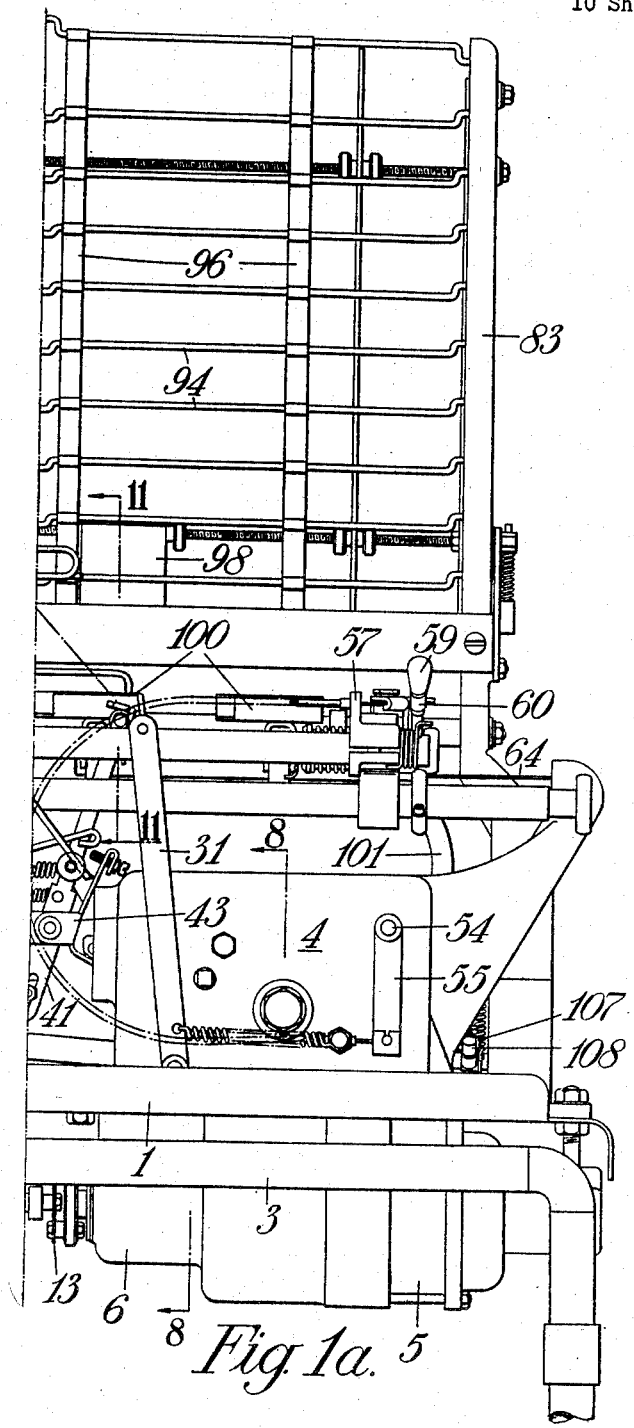
Figure 2:
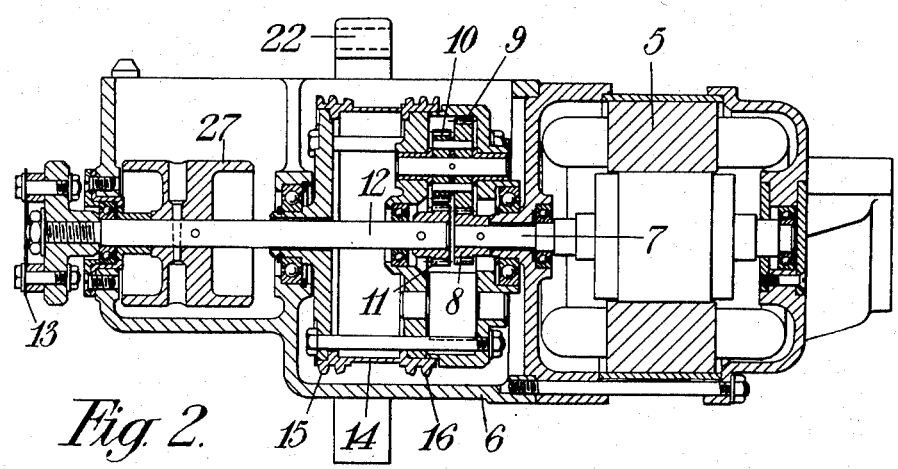
Figure 2 is a vertical section of the electric motor assembly.
Figure 3:
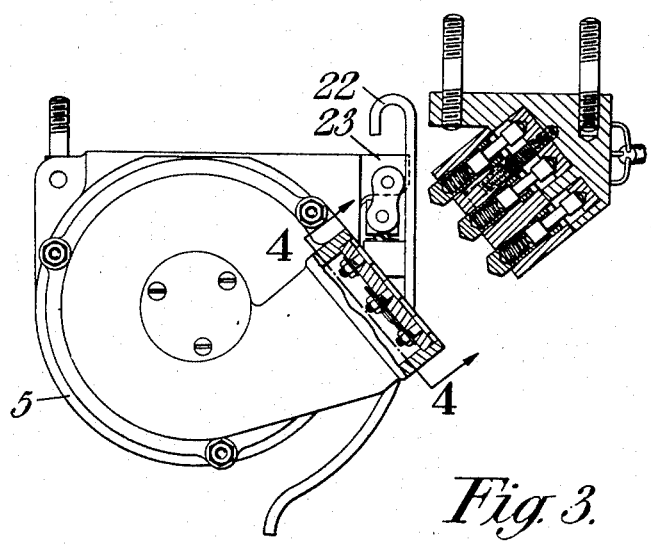
Figure 3 is an exploded view of the motor and contacts in elevation partly in section.
Figure 4:
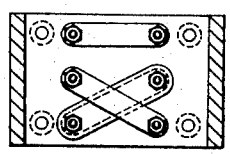
Figure 4 is a section on the line 4—4 of Figure 3.
Figure 5:
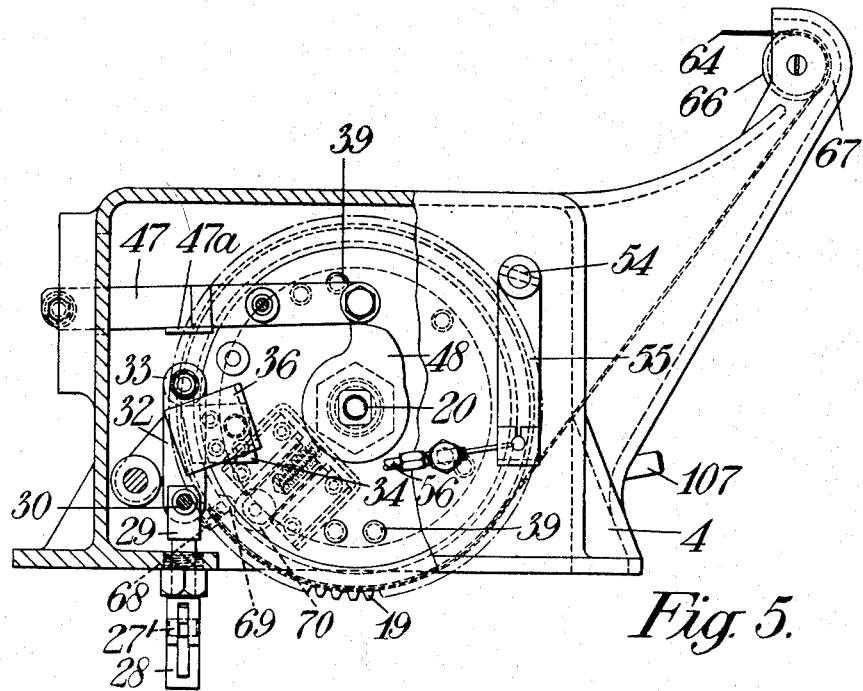
Figure 5 is a side elevation of the cam box with the casing cut away.

On a tray or chassis 1 between the underside of the winding unit 2 and its tubular mounting frame 3 and extending forward is mounted the automatic mechanism 4 for effecting the operation necessary in the doffing or pirn changing.

The automatic mechanism is basically a rotary cam box, each cam or like rotary actuated device controls through associated linkage one or other of the functions required, all movements taking place in the course of one complete revolution of the main shaft through the centre of the unit.

A single built-in reversible electric motor 5 is arranged to drive either the winding unit or the automatic change and this, therefore, replaces the normal arrangement whereby a similar motor is housed within the winding unit. The motor is situated underneath the tray or chassis at the front and the drive is transmitted by a novel scheme whereby the motor is kept continuously running and yet is able to drive either the winding unit or the automatic mechanism 4 alternatively at will.

It is also necessary that the winding unit can be driven in either direction of rotation, but the automatic mechanism must, by reason of the order of the cycle of operations it has to perform, revolve in one direction only. Further, the relative speeds of the two functions are widely different since winding speeds are up to 4,000 R. P. M. yet the automatic unit has to make only one revolution at a time and necessarily taking a few seconds to do it, since as aforesaid it represents the complete pirn change cycle. To achieve the objective, epicyclic differential gearing is employed in association with right- and left-hand worm gearing.

The motor is built into or flanged to the front of a housing 6 to the underside of the tray towards the front. The motor shaft 7 has a pinion 8 engaging with one side of a cluster gear 9, being the planet wheels of a compound epicyclic reduction and differential gear unit. The other gear 10 of the cluster or pair, engages with another pinion 11 concentric with the motor shaft and mounted on, or fitted to, the end of a shaft 12 extending rearward through bearings to a disc type universal coupling 13 just outside the rear end of the casing. The planet wheels are carried in a casing 14 formed or provided with right- and left-hand worm threads 15 and 16 respectively.

The shaft terminating in the coupling through the latter, connects with a propeller shaft 17 extending further rearward to drive, through a slidable keyed portion, a pulley 18 revolvably mounted in a self-aligning bearing retained in a housing fixed to the rear end of the tray chassis, this pulley driving the winding unit, which is of known construction, through a belt.

Figure 8:
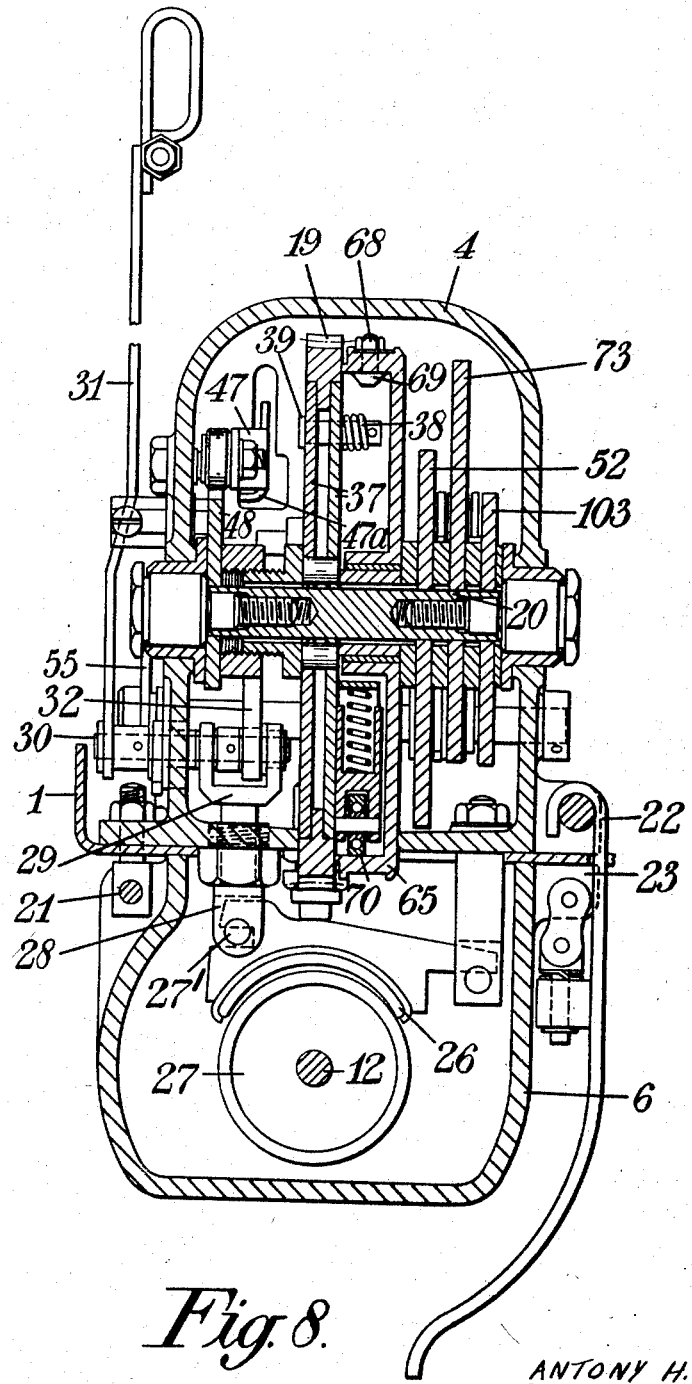
Figure 8 is a section on the line 8—8 of Figure 1.
Figure 13:
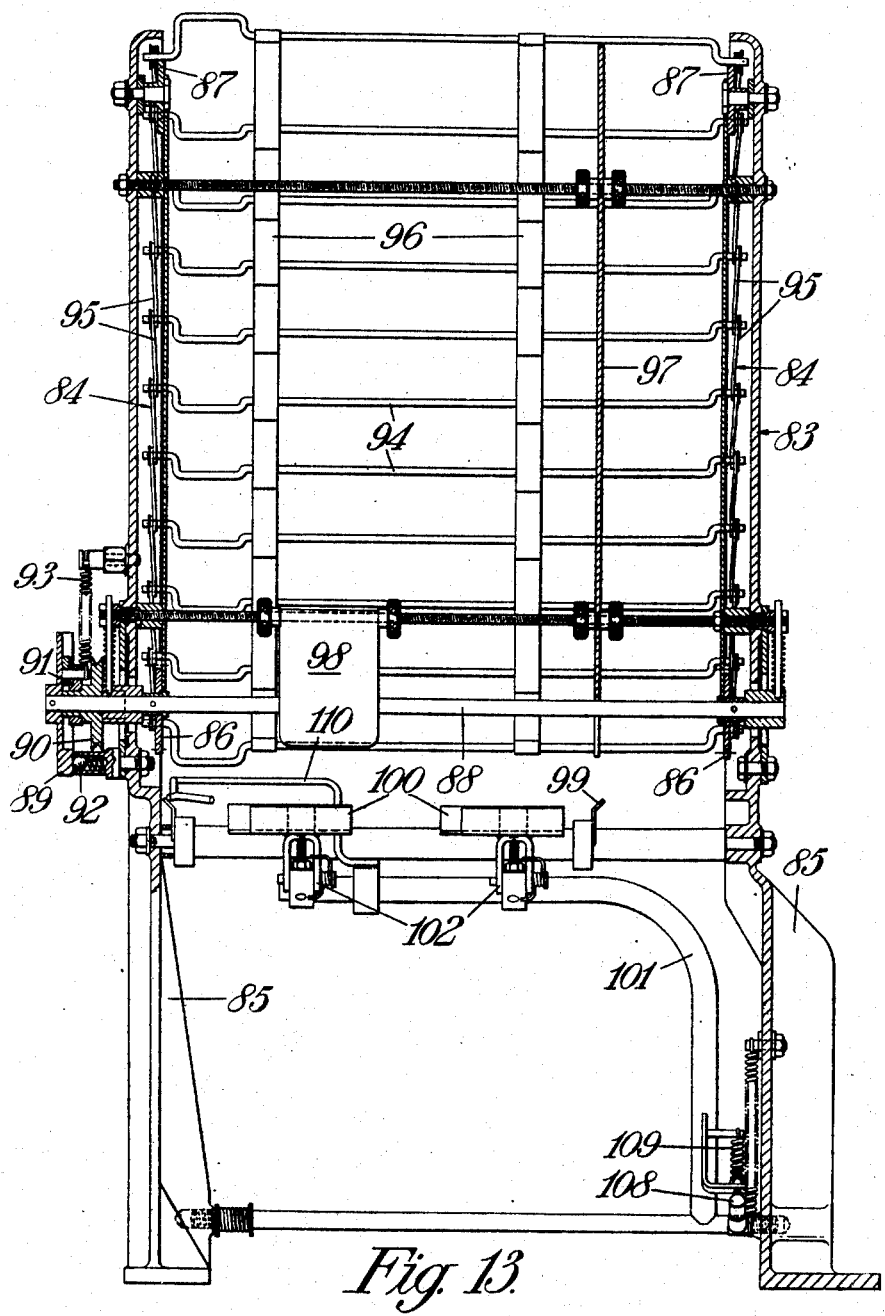
Figure 13 is a sectional elevation of the pirn magazine and loader assembly shown in Figure 1.

The opposite hand worm portions 15 and 16 engage respectively with a form of worm wheel 19 (see Figure 8) of narrow section or tooth width mounted on and driving a square shaft 20 forming the main shaft of the gear which effects the necessary operation in doffing.

For convenience of construction and in view of the reduction in speed required, the helix angle of the worms is very small and they are therefore able to engage alternately with the worm wheel mentioned which for the same reason is able to have substantially straight teeth.

The worm wheel extends through a hole in the tray and is mounted at right angles to the axis of the motor, epicyclic gearing and propeller shaft. Its own shaft 20 is mounted in bearings in the side walls of a housing 4 containing a plurality of cams and such other mechanism which it has to drive, this latter housing being secured to the top of the tray 1 immediately over the other casing 14 for epicyclic gear and is mounted underneath the tray.

This casing is hinged at one side, the hinge eyes or bolts 21 passing upwards through the tray and also the securing flange of the upper casing above and against which they are held by nuts. On the opposite side, a latch 22 is provided hooked over a pin retained in lugs at the base of the upper casing and connecting, via a toggle link, with the lug 23 on the side of the lower casing, the latch accordingly passing through a hole in the tray which is thus sandwiched in between the casings.

The object of this arrangement is to enable the lower casing to swing down upon releasing the latch, thus disengaging the worm from the worm wheel. When so positioned, the lower casing 4 can be slid bodily back and forth in a direction parallel with the motor and propeller shaft axis, thus enabling either of the opposite handed worms 15 and 16 to be engaged with the wheel 19. A dowel engagement ensures accurate positioning axially on re-engaging the latch. The universal coupling connecting the propeller shaft 17 and also the self-aligning bearing for the pulley 18 are incorporated to permit of the action described. It should be mentioned that the coupling also serves to sever the shaft connection for the convenience of removing the whole machine from the frame or stand on which it is mounted.

The arrangement thus enables the motor 5 and winding unit 2 to run in either direction of rotation but by appropriately engaging either worm 15 or 16, the pirn changing mechanism operates in one direction only.

The direction of rotation of the motor is changed by reversing the electrical connections to it. These are in the form of fused contacts housed in a block under the front end of the tray and engaging with either of two sets of alternately cross-connected contacts mounted tangentially across the rear housing of the motor. Thus, by sliding the whole lower unit as previously described, the electrical connections and therefore the rotation of the motor, may be reversed, the whole arrangement associated with the worm etc. therefore being substantially foolproof when changing the direction of rotation.

It follows that because of the differential form of epicyclic gearing employed, either the winding unit or the auto unit can be driven by the motor, provided one is held to form the reaction for the rotation of or drive to the other. This is therefore the basis of the change from winding to pirn changing and vice versa. When the auto unit is functioning a brake holds the winding unit. This brake also serves to stop the winding unit quickly as is necessary to avoid overrunning on winding.

The pirn changing unit is held, when required, by a positive stop or trip 33 engaging with a face or ledge 34 projecting from one side member of the worm wheel. The two foregoing functions are interconnected for reasons which will be apparent later.

The brake is in the form of a shoe 26 hung from the underside of the upper housing of the pirn changing mechanism and engages with the periphery of a drum 27 attached to the shaft 12 passing through the rear portion of the lower casing to the coupling 13 mentioned earlier.

This drum is formed with two friction surfaces side by side to allow for the alternative lateral positions of the lower casing with respect to the upper casing when either worm is engaged.

The brake shoe is of the floating type and is adjustably sprung at its centre towards the drum (see Figure 6). A pivot 27' is arranged to one side or end and the opposite end is anchored to a fork 28 sliding vertically in a guide furnished in the bottom of the upper casing and connecting with another fork 29 through which a spindle 30 passes horizontally, forming the pivot for and connecting two substantially vertical levers 31 and 32 respectively one inside the casing and one outside it. Where the spindle passes through the side wall of the upper housing, a suitable sliding guide is provided to allow of the vertical travel associated with the brake shoe movement. The inside lever 32 of the two mentioned terminates in a roller 33 comprising part of the worm wheel stop or trip referred to. The other fitted external to the casing, is arranged to rise high enough to engage with the tailstock body of the winding unit.

The action associated with the foregoing parts is as follows:

The roller at the top of the inner lever is lightly sprung, via the external lever, towards the centre of the cam shaft 20 or worm wheel, thus permitting it ultimately to arrest the rotation of the worm wheel after freeing the brake, by engaging with a face or ledge of a block or cam 34 attached to one side member of the worm wheel as aforementioned.

Thus, the action of the auto mechanism is definitely confined to one revolution of the shaft driven by the worm wheel and also the winding unit drive freed to operate by releasing the brake. When, subsequently, the winding unit has reached the conclusion of a winding operation, and the carriage carrying the pirn being wound between centres, has advanced shoably into the winding unit box 2 with the tailstock body at the outer end and thus coming into contact with the external lever 31 of the two just previously mentioned, this lever acting through the spindle joining it with the internal lever 32 causes the latter to force or trip the roller 33 attached to its upper end, off the ledge projecting from the worm wheel side member 34 thus again freeing rotation of the worm wheel and therefore permitting the operation of the pirn changing mechanism and applying the brake to the winding mechanism. A light externally fitted spring and an escapement formed by a pin 35 from the roller lever 32 engaging a cam segment 36 formed as part of the worm wheel ledge, ensures that the roller mounts the ledge each time or cycle.

The worm wheel construction comprises a rim sandwiched between two discs 37 under pressure from several springs 38 compressed by pins 39 radially disposed but passing horizontally through both discs. The latter having square holes at their centres engage with the square sectional main shaft 20 to drive it and also the cams etc. mounted thereon. The arrangement provides what might be termed a "slipping clutch" to fulfil the following functions. Firstly, it limits the torque transmitted to the cam shaft which, due to the considerable gear reduction involved, can be considerable. Secondly, because of the former, the load upon the trip mechanism is kept reasonably low so as to make its operation light, thus not imposing any great strain on the winding unit feed which has to operate it.

Thirdly, the inertia of the whole epicyclic or differential gear arrangement and the worms, all of which revolve at speed when the auto unit is operating, has to be dissipated when the unit is brought abruptly to a stop by the operation of the trip. Finally, the arrangement also provides an escape for the driving motor in the event of seizure of any part of either unit, or external interference.

The essential functions of this pirn changing unit are the operations performed in one cycle or revolution of the main shaft in the following order in which they occur:

(a) Rotation of the shaft of the pirn changing unit is permitted. Thread guide simultaneously tripped to a rearward position re-setting the bunch building mechanism in the winding box (if fitted) thereby and bringing the guide to a position immediately over the driving centre face pad.

(b) Feed nut released or disengaged from the feed screw inside the winding box.

(c) Whole carriage supporting the full pirn between centres withdrawn from the winding box and out to a stop as normally provided.

(d) A collector over the head of the pirn takes the length of yarn leading down to the wound pirn and draws it in a loop to the right of the pirn where it holds it nipped.

(e) A cutter at the end of the collector cuts the yarn on the pirn side of the loop (to free the pirn).

(f) Simultaneously with the former two events, the magazine above and to the right, is indexed to release an empty pirn into the loading trough.

(g) The tailstock (outer) centre quill is withdrawn to release the full pirn, which falls down into a suitable container under the machine or on to a conveyor belt running there.

(h) The loader to the right and under the magazine, swings the empty pirn in its trough over to a position between the centres of the winding unit and at the same time a guide wire connected with it engages the length of yarn, formerly part of the loop, left between the feed point and the aforementioned collector (still holding the end) and draws it in another loop over and across the driving face of the innermost driving centre.

(i) The tailstock quill and centre is released to move it, gripping the empty pirn between the centres and also gripping the yarn between the head of the pirn and the driving centre face.

(k) Feed nut re-engaged with the screws.

(l) Loader returned to under the magazine.

(m) Collector returned away from the running path of the yarn.

(n) Thread guide straight back to the winding position.

(o) Auto action stops releasing the brake on the winding unit which then starts up smoothly.

Some overlopping of some of these functions actually occurs, thus reducing the overall time of operation.

When required, a secondary knife comes into operation after the winding commences for the purpose of cutting off close to the head of the pirn, the tail of yarn from the remains of the collector loop trapped under the head of the pirn. The knife is mounted above the pirn at the rear and to the front of the winding box lids. It swings down on an arm with the point of the knife rubbing the head of the pirn and thus cutting through the yarn laying along it. The cam formed from wire and fixed along the carriage bar actuates the knife through the feed imparted to the carriage during winding.

The release or starting mechanism of the auto action has already been described, so the next item to be dealt with in detail is the mechanism associated with simultaneous operation of the thread guide trip. The thread guide of the winding unit is re-arranged, so that coaxially with its normal lever pivot, there is an enshrouding form of bracket, also free to pivot. For reference it might be mentioned that the thread guide is oscillated in operation by a revolving cam in the winding unit engaging a roller follower connected with the guide lever by a link. The roller is caused to follow the cam by spring pressure.

Figure 10:
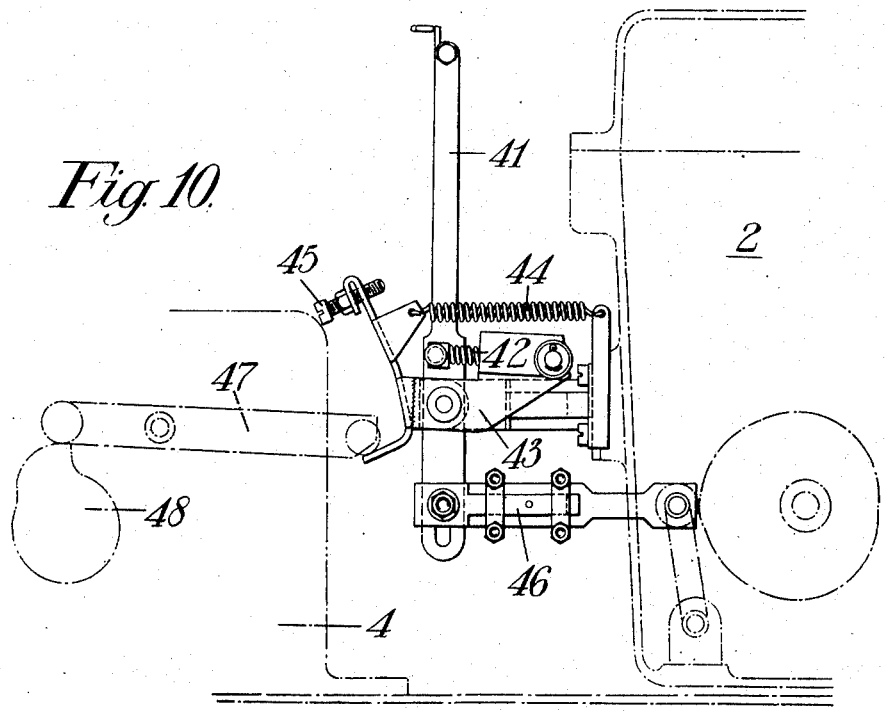
Figure 10 is an elevation of the thread guide trip mechanism as seen from the reverse side.

The arrangement of the springing is changed for the automatic tripping so that a compression spring 42 (Figure 10) is located between the thread guide lever 41 and the enshrouding bracket 43. Thus, the spring pressure is applied via the bracket. The bracket has another tension spring 44 between it and the winding unit box which when required to do so, pulls the bracket around its pivot coaxial with the thread guide lever in such a direction as to draw the thread guide lever backwards towards the winding box by reason of the fact that an adjustable stop 45 is positioned through the upper lug of the bracket to engage the outer edge of the lever for the purpose. An adjustable telescopic link 46 between the winding box cam follower and the thread guide lever allows of the former movement to take place regardless of the cam follower position.

It follows therefore that by rocking the bracket on its pivots, the thread guide and its lever is either held backwards by tension spring pressure pulling on the bracket, or is brought forward against the pressure of the tension spring so as to be freely oscillated by the rotating cam through its follower and the link is then fully retracted telescopically.

Movement of the bracket against its tension spring is effected by a horizontal roller ended lever 47 extending backwards from the housing 4 for the main portion of the driving mechanism operating in pirn changing and engaging another lug projecting from the bracket towards it and under it.

The lever is pivoted from the inside wall of the housing and at its inner extremity beyond the pivot has another roller engaging with a cam 48 for the purpose of rocking it and imparting a similar movement to the thread guide bracket for the purpose already mentioned.

Between the lever pivot point and the roller engaging the bracket 43 there is a ledge 47a (see Figure 9) arranged on the outward side of the lever 47. Alongside there is a vertical lever 49 which is also parallel with the other trip lever 32 mentioned as forming part of the main release trip. At the top of the lever concerned, there is a roller 49a and the lower end is free to oscillate or rock on a pivot 50 extending in from the side wall of the opening. The roller 49a is engaged with the upper face of the ledge 47a on the horizontal lever for the purpose of holding this latter lever down. This in turn holds the thread guide bracket 43 rocked against the tension spring anchored to it, to the position for winding, where the thread guide and its lever 41 are free to be oscillated for laying the yarn being wound on to a pirn. The last-mentioned vertical lever 49 is constrained by or linked with the other main trip lever alongside, by a projection of the main trip roller pin, bearing a slipper 51 and passing through a slot 49b in it. Thus, when the main release trip operates, the vertical lever 41 is also tripped in a similar fashion by its own lever roller 49a being rolled off the edge of its ledge and thus the associated thread guide is tripped as desired simultaneously. The object of having separate vertical levers for each trip and a connecting slipper is so that the thread guide function is not affected by the vertical movement associated with the other main trip lever by virtue of its connection with the brake operation.

Reverting to the horizontal lever function, the rotating cam 48 it engages through the roller at its inner extremity is for the purpose of resetting and forcing the thread guide bracket 43 back to a position where the guide is again able to oscillate. It thus also allows the rollers 49a engaging the ledge of the lever to resume its retaining position or function. Since the main trip lever 31 and roller 49a are linked, the main trip lever 31 also then moves to a position ready to perform its arresting function. Both are under light spring pressure to return as stated earlier.

The feed nut is released by a cam and follower in the unit working through a cable to operate associated mechanism at the tailstock of the winding unit, which is re-arranged accordingly and to permit also of the withdrawal of the quill to release pirns from between centres. The cam 52 is, of course, one of those mentioned before as being mounted on the main shaft 29 of the pirn changing unit. A roller follower on a lever 53 engages with it and this lever is secured to a shaft 54 to transmit the motion to another lever 55 also secured to it but outside the casing towards the front end. The external lever connects with the core of a Bowden type remote control cable 56 the outer cover or sheath of which is anchored to a fitting projecting from the side wall of the casing.

The cable extends upwards in a loop and the outer member is anchored to the body 57 of the tailstock unit. The core connects with a combined lever and cam 58 pivoted across the top of the aforesaid body of the tailstock. The cam portion of the lever terminates in a truly radial form about the pivot centre and engages a semi-vertical pin 59 and roller 60 attached to the release nut shaft in place of the normal release catch. The top of the pin is formed as a knob for the purpose of manual disengagement.

The cam has two lift stages, the first being sufficient to actuate the feed nut release as described, and the second to withdraw the tailstock quill later in the sequence of operations. The latter is achieved by the end of the lever 58 across the tailstock being connected with, or impinging on, a projection 63 from a yoke or fork carried in a pivot fork 62 at the front of the tailstock body and extending behind the knob 61 at the outer end of the tailstock quill normally used for withdrawing it. A tappet adjustment between the lever and yoke ensures that the initial movement of the lever to operate the feed nut release does not start to withdraw the quill. Likewise, the truly radial cam portion of the lever produces no further effect upon the feed nut when the quill is subsequently withdrawn.

The withdrawal of the carriage and the fully wound pirn is effected by a steel tape 64 pulling from the drum 65 within the pirn changing unit. The tape is adjustably attached or anchored to the tailstock body and passes forward over a pulley 66 housed in a bracket 67 extending up from the pirn changing unit, the bracket being hollow to allow the tape to pass down through it and wrap around and be anchored to a grooved drum 65 forming part of the main worm wheel whereby motion is imparted to it.

This drum 65 is substantially free to revolve on the main shaft where a bearing sleeve is arranged for the purpose. The anchorage of the tape to the rim of the drum is by a headed screw extending through the rim, the lead of the screw being inside the drum and the tape being secured by a nut 68 outside.

The screw head 69 is chamfered to provide what might be termed small cam faces or ramps in either direction normal to the drum axis. A radially disposed roller 70 retained in a slide constrained in guides attached to one side member of the worm wheel and with a spring radially behind it, freely rolls the inside circumferential surface of the drum rim until it comes into contact with the screw head which it has either to jump or roll over, against the spring pressure if it is to pass. This function serves to provide a release for the tape when the carriage is fully withdrawn against a stop provided on the machine slide bars, that is, the drum pulls out the carriage by the tape and through the roller impinging on one cam face of the screw head, until the resistance of the carriage stop causes the roller to run over the screw head, thus allowing the drum to remain stationary and the roller to pass on attached to the worm wheel and revolving with the rest of the mechanism.

The collector is a pivoted arm 71 and it carries the cutter mechanism in the form of scissors 72 at its outer extremity. Another rotating cam 73 operates these two items through the medium of a cable arrangement 74 somewhat similar to that described for the feed nut and tailstock release.

The upper end of the cable sheath or cover is, in this instance, anchored to a lug 75 to the extreme left and top of a bracket attached to the front of the winding box lid and bridging the pirn aperture therein. This bracket also forms the mounting for the collector arm pivot 76. The lid also carries a pivot 24 for the tail knife 25. In addition, an upward projection carries the disc tensioning apparatus associated with the winding box when such tensioning is employed, since it replaces the bracket normally positioned there for the purpose. At the lower right-hand corner a rubber covered anvil 77 projects for the collector arm to trap the yarn against.

The inner core of the cable extends from its sheath to pass round a pulley 78 concentric with and mounted on the arm pivot 76 and thence across to pass over yet another similar pulley 79 mounted towards the top of the arm. From here the cable core passes down to be secured by a fork 72a to the moving blade of the cutter 72. The mating fixed blade of the cutter is attached to the actual collector arm 71. A tension spring 80 is interposed between the lower end of the fixed blade and the moving blade so as to tend always to keep the blades open. The moving blade pivots from, or on, the face of the fixed blade by a screw, spring washer and a nut, the screw passing through both holding them together with the nut under slight spring washer pressure for ensuring efficient cutting.

Projecting forward from the right hand of the collector arm is a spindle portion arranged to impinge on the yarn passing down to the pirn through the thread guide and to guide or carry the yarn over to the right and so as to hold it gripped against the anvil mentioned before. The collector arm is sprung by a torsion spring arranged around its pivot, so as to resist the former action. The cable, on being pulled by the cam and follower motion, overcomes the spring just mentioned and therefore forces over the arm and this, in contacting the anvil, causes the cable to continue in its effort directly against the movable cutter blade which, so far, has provided the necessary reaction through the greater portion of the tension spring across the blades resisting their closing which must then, however, ensue, cutting off the yarn as required.

Simultaneously with the former functions, the same cam in the pirn changing unit operates another independent cable 81 which is connected with the magazine 83 storing the empty pirns ready for winding. In effect, a second cable connection is made with the external lever 82 leading from the cam follower, which connection terminates at a ratchet device for indexing the magazine 83 to release one empty pirn at a time to the loader mechanism, as required in each cycle of operations.

The magazine itself is in the form of a novel belt feed where what might be termed "a wide chain" 84 is arranged to the right and above the pirn winding centre and parallel with same. Two end brackets 85 rising up from fixings on the top of the underneath tray or chassis of the whole machine also form the end housings, between which the chain or belt revolves in a loop around two sprockets 86 at the bottom and two idler wheels 87 at the top. The bottom sprockets are connected by a through shaft 88 mounted in bearings slidable vertically and sprung down in the brackets, the shaft extending rearward through the rear bracket to carry the index wheel 89 of the ratchet arrangement with which the cable mentioned earlier connects. The cable is wound around a drum 90 and is there anchored, so that pulling on it rotates the drum. The drum has an extension carrying a pawl 91 which engages with the slots of the index wheel 89 thus turning it one pitch at a time. A sprung ball detent 92 arrangement engages each slot as it revolves around into position, thus ensuring accurate indexing. When the cable tension is released, a tension spring 93 applied to the pawl mounting allows it to return again to pick up another index slot and so on.

The chain or belt 84 comprises a series of wires 94 conforming approximately in shape to the lengthwise profile of a pirn. These wires form what would normally be the rollers of a chain, since the ends of same pass across or through the sprocket teeth and over the idler circumference and are connected and separated by single overlapping links 95 just external and adjacent to the sprocket and idler faces. Split pins retain the links then forming an endless chain. The wires are so pitched that a pirn can just be inserted between them. Looped from one wire to the next are two or more flexible endless fabric tapes 96, each loop being of sufficient length to festoon and carry a pirn in the trough the festoon forms. The whole assembly is rotated anti-clockwise when viewed from the front of the machine, thus pirns are passing upwards to the right-hand side of the centres of the sprockets and idlers and down to the loader troughs on the left-hand side.

It follows that each time the chain is moved in the said direction one pitch, a pirn is freed and falls out at the bottom into the loader troughs. At the same time, pirns are passed over the top idler wheels and hung in the tape loops, thus being free to roll over from one side of the loops to the other as is necessary to maintain the festoons in the correct way up on the opposite sides of the magazine. An adjustable end plate 97 takes account of the variations in pirn length and an ejector plate 98 is fitted near the bottom to make sure that pirns are completely ejected. Adjustable guides 99 accurately position the pirn endwise in the loader troughs 100 when falling down into same.

The loader takes the form of an upright tubular frame or arm 101 pivoted at the bottom in bearings adjacent to the right-hand edge of the main tray or chassis. It swings in an arc to the left, from a position almost vertically under the magazine, to a position in between the winding unit centres for loading. The top or upper tube of the frame, running parallel to the axis of the centres, carries two troughs 109 mounted on arms 102 adjustable along and around the said tube. The troughs are themselves also adjustable and inclinable at the ends of the arms and are torsion spring loaded so as to tend to remain substantially vertical against the adjustment screw stops provided. The object of the manifold adjustments the combined arrangements provide is to make allowances for varying lengths and head shapes and sizes of different types of pirns and to also accommodate the varying diameters and amounts of taper, etc., they possess. Thus, more or less any pirn can be aligned in the troughs to correctly engage between the winding centres. The springing of the troughs against their arms is to allow them to swing clear away round from under the pirn when it has been picked up between the centres and the loader is therefore required to return ready to receive the next pirn.

The swinging of the loader is controlled by yet another cam 103 within the pirn changing unit. A roller follower on this cam is mounted in a lever 104 attached to a shaft 105 passing through a housing in the wall of the casing at the right-hand side near to the front and base. The shaft terminates in a boss 106 which has a rod 107 projecting from it at right angles to engage, by crossing, another similar rod 108 attached to the loader arm at right angles to it. Thus the motion from the cam is imparted to the loader. A spring 109 is used to effect reverse or return motion and is anchored between the rod from the loader arm and a bollard on the front magazine bracket. The actual connection with the loader arm is split coaxially and lightly sprung together, with an adjustment in between for bodily setting the position of the whole arm and troughs relative to the cam and the rest of the machine. The arrangement also provides for relief should anything obstruct the inward (loading) movement of the arm during operation. Thus any damage to the machine, or to operatives' hands, if in the way, and so forth is avoided.

Attached to the loader arm is a wire guide 110 for the purpose of guiding the yarn over or across the driving face of the driving centre so that the yarn may be trapped between it and the pirn head when the pirn is gripped between the centres ready to start the winding operation.

Alternative magazine arrangements will be described devised to enable pirn winding machines to be operated automatically in an unusual fashion. Fully automatic machines are normally only supplied, or fed, from large yarn packages in the form of cones or cheeses, so that long uninterrupted runs can be made, thus allowing the maximum number of pirn changes to be made automatically and entailing the minimum of attention. Small packages are generally wound manually because of the frequent stoppage necessarily incurred to "knot-up" or "tie-in," fresh supply packages, which to date, can only be performed satisfactorily by hand—though usually with the aid of a hand knotting machine.

The supply of yarn direct from the spinning processes prior to winding and weaving, is obtainable in two forms:

A cop, which is mule spun, and generally small, i. e. less in yarn content than that which can be wound on to an average pirn.

A ring tube which is ring spun and generally larger than a cop, i. e. containing one to three times as much yarn as can be wound on to a pirn. This latter process is the more modern one and thus, coming more into use for the obvious reason that it contains more yarn and is therefore easier for subsequent processing and handling.

In the case of the latter ring tube packages, and where two or more pirns can be wound from one tube of yarn, there is an opportunity afforded for semi-automatic pirn winding in place of either pirn winding manually or fully automatically.

With the semi-auto arrangement some of the work of manual pirn changing is obviated and the need for prior cone winding eliminated, thus providing a more economical and direct means for transferring the yarn from the ring tubes as spun, to the pirn required for weaving. Apart from reducing the labour involved in the process, less plant and floor space are involved since a greater output per spindle can be achieved from the pirn winder and also, of course, no cone winding machines are required.

To achieve the desired object, the pirn winding machine has to be suitable for efficient manual operation and for automatic operation as well. For manual operation, the paramount need is accessibility for "piecing-up" (knotting) fresh supply packages.

The large capacity empty pirn machine previously described necessarily occupies a lot of space and is located above and close to the pirn spindle so as to economise in space and also for the convenience of loading it and transferring the pirns to be wound. This arrangement impairs accessibility for the purposes in view.

However, for the particular mode of operation required, only a small capacity magazine is necessary, due to the limited number of automatic changes which can be performed before manual operation attention is necessary to replenish the supply package when at the same time further pirns can be loaded into the magazine without loss of efficiency.

Thus, the alternative magazine has been devised to contain three pirns in reserve, one above the other, in a position below the spindle level and to the right of same and of the auto cam box, leaving room for loading it from the left-hand side, by using the space between it and the cam box through which the fully wound pirn is dropped or ejected, as is normally done. Note, however, that the design of the magazine is not necessarily restricted to only three pirns capacity—it could be made any depth within reason. The pirns are transferred from the magazine to the winding position by an arm in a somewhat similar fashion to the normal or previous arrangements, except that pirns are fed up to the arm which is now above the magazine and not down to the arm from above, as before.

The mechanism involved is shown in Figures 15-19 and comprises a fixed rack 111 mounted on a slide 112 attached to the main underneath machine tray or chassis and parallel with the machine spindle axis, it having adjustable ledges 111a at each end to receive pirns one above the other, the ledges being saw-tooth like to facilitate the movement of pirns from one to the other. The motion is to transfer pirns upwards one ledge at a time, until the top position is reached ready for picking up by the loading arm. Adjacent to each rack ledge is a "helper" pad 113 carried on an arm pivoted vertically from a rearward pillar, the pads being sprung torsionally towards the racks, with an inclined face, towards and abutting with the pirn, for the purpose of retaining it there in between each successive movement from one ledge to the other.

To either end, in line with and a little away from each end of the racks and mounted on the same base slide, are pillars 114 containing slides movable up and down. One slide is for lifting the head end of a pirn, the other for lifting the tail end of a pirn through each successive rack ledge position. Attached to the front or outer faces of the slides and facing the ends of the pirns and racks, are spring centred clips or grippers 115 arranged to be adjustable to receive the head and tail diameters of any of the great variety of shapes or forms of pirn in common use.

The grippers vary slightly as between one end pillar and the other, which is largely on account of the pirns being larger at the head than at the tail end, the balance point of same being nearer the head than the tail. The functional characteristics of each type of gripper are, however, the same. When the slides rise to transfer pirns, the grippers pick up the pirn from underneath each end and lift it to the next rack position, and since they are mounted on pivotable eyes 116 in the slides, they are thereon free to swing out at their tops to allow the pirn to follow the rack contours.

Upon the slides and grippers rising to the correct positions for the pirns to roll on to the respective rack ledge, under the combined influence of the helper pads (mentioned earlier) and the centralising springs 117 of the grippers themselves, the slides are tripped and fall, the grippers leaving the pirns behind on the ledges by falling from underneath them. In the process, the grippers have to pass down and over the ends of the pirns which have previously moved up to the rack stations from which the grippers originally came. This is achieved by the grippers having cam faces 118 arranged towards the front of them which engage the pirn ends and, since the grippers are also pivotable in a line at right angles to the pirn axis, they are deflected back against their centralising springs until they are able to pass down over the pirn end faces and thereupon swing in underneath them ready to pick up for the next cycle. In other words the grippers are, by their mountings, free to move in vertical planes at right angles to each other against the influence of single individual centralising springs under tension.

The heads 119 of the eyes for mounting the grippers are hemispherical shaped and act as end locations for the pirns in the magazine. For similar purposes, there are guide members 120 attached to the top of each slide.

The lifting and tripping of the slides is done by means of a Bowden (R. T. M.) cable arrangement connected with the auto mechanism in the same position and manner as for the other magazine. The harness and cable arrangement comes from the auto cam box connection and terminates, respectively, in an adjuster and bridging fork 121 at the top of the forward pillar, so as to provide twin cables from there on—one passing directly down to the forward (head) slide catch and the other passing through another harness to the rear pillar where it passes over a pulley arranged near to the top and thence down inside the pillar to the rearward (tail) slide catch 122.

The catches hook on to pins projecting from the slides under the tension of weights 123 hanging from the bottoms of the catches by cables passing down through the base slide etc. When the slides are hauled up by the cables and catches respectively, the catches eventually impinge on cam blocks 124 so arranged in the walls of the pillars as to pull the catches off the pins, thus allowing the slides to fall clear at the correct moment of sufficient lift, thus producing the necessary trip effect. The weights mentioned, return the catches to pick up the slides again in due time, ready to commence the next cycle.

The loading arm 125 differs from the one employed for the large magazine, in that it has a different pivot point and correspondingly greater travel necessary to swing a pirn to the winding position between centres. Apart from this, it is furnished with clips 126 instead of troughs to remove and hold the pirns during loading. These clips hang down like scissors and are sprung to grip the pirn when transferred up to them, or when loading, and also to allow the inner clip member to swing open sufficiently under pressure to clear, or get free, over the top of the loaded pirn for the purpose of allowing the arm to return as soon as the pirn is gripped between the machine centres ready for winding to proceed.

I claim:

1. An automatic pirn-winding machine comprising a winding mechanism, a pirn-changing mechanism, braking means for the winding mechanism, braking means for the pirn-changing mechanism, means for alternately applying the two braking means, a driving means, a differential gearing driven by the driving means in either direction at will, to drive in turn the winding mechanism in either direction and the pirn-changing mechanism in one direction only.

2. An automatic pirn-winding machine comprising a winding mechanism, a pirn-changing mechanism, braking means for the winding mechanism, braking means for the pirn-changing mechanism, means for alternately applying the two braking means, an electric motor, an epicyclic differential gearing driven by the electric motor, a slidable carriage containing the electric motor and the epicyclic differential gearing, reversible electrical connection to the motor adapted to be reversed by sliding the carriage between two positions, a first output shaft of the epicyclic differential gearing for driving the winding mechanism in either direction, a second output shaft of the epicyclic differential gearing, right and left-hand worm gearing driven by said second output shaft and a worm wheel for driving the pirn-changing mechanism and engaged by the right or left hand worm gearing, for driving the pirn-changing mechanism in the same direction independently of the direction of drive of the winding mechanism.

3. A pirn-changing mechanism as claimed in claim 2, in which the pirn-changing mechanism is held by a positive stop engaging with a face projecting from one side member of the worm wheel driven by the worm gearing.

4. A pirn-changing mechanism as claimed in claim 3, in which when the winding mechanism has reached the end of a winding operation it operates a lever which trips the positive stop from the face to free the rotation of the worm wheel and also applies the brake to the winding mechanism.

5. A pirn-winding machine as claimed in claim 2, in which the worm wheel is an annulus sandwiched between two discs under pressure under the action of a plurality of springs positioned about the discs and passing horizontally through them, the shaft on which they are mounted having mounted upon it a plurality of cams.

6. A pirn-winding machine as claimed in claim 5 in which a collector over and adjacent to the head of the pirn is operated by one of the cams through the medium of a cable arrangement and takes the length of yarn leading down to the wound pirn and draws it in a loop to the right of the pirn where it holds it nipped.

7. A pirn-winding machine as claimed in claim 6, in which a cutter is provided on the end of the collector and is operated by the cable to cut the yarn, enabling the full pirn to be freed.

8. A pirn-winding machine as claimed in claim 7, in which the cutter comprises two vanes hinged together scissor-wise.

9. A pirn-winding machine as claimed in claim 6, in which means is provided in the form of a guide wire adapted to engage part of the loop and left between the feed point and the collector which still holds its end to draw it into another loop over and across the driving face of the driving centre.

10. An automatic pirn-winding machine as claimed in claim 2, in which the pirn-changing mechanism is operated over a plurality of cams and is effected by a single revolution of the worm wheel.

11. An automatic pirn-winding machine comprising a winding spindle for driving a pirn to be wound, a driving centre of the winding spindle, an outer centre for the pirn to be wound, a carriage for withdrawing the driving centre and outer centre to a starting position, a threaded feeding member for advancing the carriage during the winding operation, a pirn-changing mechanism, braking means for the winding spindle, braking means for the pirn-changing mechanism, means for alternately applying the two braking means, means driven by the driving means to drive in turn the winding spindle and the pirn-changing mechanism, a thread guide, a bunch building mechanism and means for simultaneously tripping the thread guide into a rearward position on the release of the drive of the winding unit and the application of the braking means thereto, re-setting the bunch building mechanism and bringing the thread guide to a position immediately over the driving centre, these operations being effected prior to the release of the threaded feed member and the withdrawal of the carriage supporting a full pirn.

12. A pirn-winding machine as claimed in claim 11, in which the release of the threaded feeding member is effected through the intermediary of a cam acting through a linkage and a flexible cable, the cam having two lift stages, the first being sufficient to actuate the release of the threaded feeding member, and the second to withdraw the outer centre from engagement with the full pirn.

13. A pirn-winding machine as claimed in claim 12, in which there is provided a lever extending across the outer centre and connected with or impinging a projection from a yoke or fork carried on a pivot fork at the front of the outer centre body and extending beyond a nut on the end of the outer centre which would normally be actuated by hand for withdrawing the outer centre, adjustment between the lever and yoke being provided to ensure that the initial movement of the lever in actuating the threaded feeding member release does not start to withdraw the outer centre; a truly radial portion of the cam of the lever being provided so that no further effect upon the threaded feed member will occur when the outer centre is withdrawn.

14. A pirn-winding machine as claimed in claim 12, in which the withdrawal of the carriage into its initial winding position after release of the threaded feeding member is effected by a flexible member, one end of which is secured to the carriage and the other to a drum with which is associated means adapted at appropriate intervals or times to rotate the drum in a direction to wind the flexible member on to it, and means adapted to release the drum to permit feed motion of the carriage in the operation of winding a pirn.

15. A pirn-winding machine as claimed in claim 14, in which the connection of the flexible member is effected by securing one end to the outer centre.

16. A pirn-winding machine as claimed in claim 15, in which the flexible member is adjustably anchored to the tailstock body and passes through a hollow bracket in the drum to which it is anchored and which is provided with means whereby its rotation is interrupted when the carriage has reached its extreme outward position in which it engages against a stop.

17. A pirn-winding machine as claimed in claim 14, in which the drum is located on the same shaft as a worm wheel and is driven thereby.

18. A pirn-winding machine as claimed in claim 17, in which the drum is driven through a roller in a slide constrained by guides attached to one side disc of the worm wheel, formed in an arm within the drum and spring-constrained in a radially outward direction, while the rim of the drum is provided with a member, chamfered on its opposite sides to provide small cam faces or ramps, so that the roller in question may freely roll round the inside of the circumferential surface of the cam rim until it comes into contact with it, and then either jumps or rolls over.

19. An automatic pirn-winding machine comprising a winding spindle for driving a pirn to be wound, a driving centre of the winding spindle, an outer centre for the pirn to be wound, a carriage for withdrawing the driving centre and outer centre to a starting position, a threaded feed device for advancing the carriage during the winding operation, a pirn-changing mechanism comprising a magazine and a loading arm, the magazine being adapted to feed successive pirns at appropriate intervals to the loading arm which is adapted to be swung from a position adjacent to the magazine to a position adjacent the centres, so that on the release of the outer centre, the empty pirn will be gripped between the centres and will also grip the yarn which has been drawn across the driving centres thereby gripping the yarn between the head of the pirn and the driving centre, and a common driving means for the winding spindle and pirn-changing mechanism.

20. A pirn-winding machine as claimed in claim 19, in which the magazine is a wide chain, to the hinged pins of which are secured two or more lengths of flexible endless tapes arranged to form loops extending from one chain to the next chain, so that the loops or troughs form a festoon adapted to carry a pirn.

21. A pirn-winding machine as claimed in claim 20, in which the chain comprises two sets of links engaging wires extending between the two sets, the wires forming the rollers of the chain and engaging upper and lower sprockets to which motion is imparted at suitable intervals or continuously at an appropriate speed, so that the chain is moved through one pitch in the interval between feeding one pirn to the centres and fully winding the pirn and releasing it, to supply the next succeeding pirn.

22. An automatic pirn-winding machine as claimed in claim 19, in which the pirn magazine is located below the winding mechanism whereby the machine is free for manual pirn changing.

23. A pirn-winding machine as claimed in claim 19, in which the pirns in the magazine are transferred upwards on a fixed rack, one ledge of the rack at a time, by means of grippers which pick up the pirn from underneath each end and lift it to the next rack position.

24. In an automatic pirn-winding machine comprising a winding mechanism, a pirn-changing mechanism and a pirn magazine the improvement which consists of a magazine in which the pirns are transferred upwards on a fixed rack, one ledge of the rack at a time, by means of grippers which pick up the pirn from underneath each end and lift it to the next rack position.

25. An automatic pirn-winding machine comprising a chassis, a winding mechanism, a pirn-changing mechanism and a pirn magazine, all mounted on the chassis, an electric motor and associated epicyclic differential gear mounted underneath the chassis for driving in turn the winding mechanism and the pirn-changing mechanism, means to brake the winding mechanism to permit the epicyclic differential gear to drive the pirn-changing mechanism and a second means to brake the pirn-changing mechanism to permit the epicyclic gear to drive the winding mechanism.

ANTONY HARRY CROUCHER.

References Cited in the file of this patent

UNITED STATES PATENTS

| Number | Name | Date |
|---|---|---|
| 2,234,356 | Reiners et al. | Mar. 11, 1941 |
| 2,247,718 | Treckmann | July 1, 1941 |
| 2,378,978 | Brugger | June 26, 1945 |
| 2,426,168 | Abbott et al. | Aug. 26, 1947 |
| 2,439,519 | Marcellus | Apr. 13, 1948 |

FOREIGN PATENTS

| Number | Country | Date |
|---|---|---|
| 43,996 | Holland | Sept. 15, 1938 |
| 226,210 | Switzerland | July 1, 1943 |